US012699072B2

(12) United States Patent
Campbell et al.

(10) Patent No.: US 12,699,072 B2
(45) Date of Patent: Aug. 4, 2026

(54) DYNAMIC HEATING OF A DIFFERENTIAL MOBILITY SPECTROMETER CELL

(71) Applicant: DH Technologies Development Pte. Ltd., Singapore (SG)

(72) Inventors: John L. Campbell, Milton (CA); Bradley B. Schneider, Concord (CA); Thomas R. Covey, Newmarket (CA)

(73) Assignee: DH Technologies Development Pte. Ltd., Singapore (SG)

( * ) Notice: Subject to any disclaimer, the term of this patent is extended or adjusted under 35 U.S.C. 154(b) by 242 days.

(21) Appl. No.: 18/262,972

(22) PCT Filed: Feb. 23, 2022

(86) PCT No.: PCT/IB2022/051606
§ 371 (c)(1),
(2) Date: Jul. 26, 2023

(87) PCT Pub. No.: WO2022/180549
PCT Pub. Date: Sep. 1, 2022

(65) Prior Publication Data
US 2024/0085373 A1      Mar. 14, 2024

Related U.S. Application Data

(60) Provisional application No. 63/152,918, filed on Feb. 24, 2021.

(51) Int. Cl.
*G01N 27/624* (2021.01)
*G01N 27/623* (2021.01)
(Continued)

(52) U.S. Cl.
CPC ......... *G01N 27/624* (2013.01); *G01N 27/623* (2021.01); *H01J 49/0031* (2013.01); *H01J 49/165* (2013.01)

(58) Field of Classification Search
CPC .......... H01J 49/00; H01J 49/02; H01J 49/022; H01J 49/04; H01J 49/0404; H01J 49/0495;
(Continued)

(56) References Cited

U.S. PATENT DOCUMENTS

| | | | |
|---|---|---|---|
| 6,593,568 | B1 | 7/2003 | Whitehouse et al. |
| 7,923,681 | B2 | 4/2011 | Collings et al. |

(Continued)

FOREIGN PATENT DOCUMENTS

| | | |
|---|---|---|
| WO | 2009/143616 | 12/2009 |
| WO | 2009/143623 | 12/2009 |

(Continued)

OTHER PUBLICATIONS

Barnett et al., "Characterization of a temperature-controlled FAIMS system", Journal of the American Society for Mass Spectrometry, Elsevier, vol. 18, No. 9, Aug. 25, 2007, pp. 1653-1663.
(Continued)

*Primary Examiner* — Jason L McCormack
(74) *Attorney, Agent, or Firm* — Merchant & Gould P.C.

(57) ABSTRACT

A method of operating a differential mobility spectrometer (DMS) includes providing a heater disposed proximate a ceramic body of a DMS cell. A first control voltage is applied to the heater. A first threshold is detected by a first sensor disposed within a curtain plate that substantially surrounds the DMS cell. A second control voltage is applied to the heater based at least in part on the detected first threshold. During application of the second control voltage, a mass spectrometry analysis of a gas within the DMS cell is performed.

9 Claims, 7 Drawing Sheets

(51) Int. Cl.
H01J 49/00 (2006.01)
H01J 49/16 (2006.01)

(58) Field of Classification Search
CPC .. H01J 49/165; H01J 49/0031; G01N 27/624;
G01N 27/623
USPC ........................................ 250/281, 282, 289
See application file for complete search history.

(56) References Cited

U.S. PATENT DOCUMENTS

| | | | |
|---|---|---|---|
| 9,305,762 B2 | 4/2016 | Covey | |
| 9,425,031 B2 | 8/2016 | Schneider | |
| 9,846,143 B2 | 12/2017 | Blagojevic | |
| 10,276,358 B2 | 4/2019 | Wu | |
| 10,770,277 B2 | 9/2020 | Datwani et al. | |
| 2003/0052263 A1 | 3/2003 | Kaufman et al. | |
| 2003/0062474 A1 | 4/2003 | Baranov et al. | |
| 2004/0206901 A1 | 10/2004 | Chen | |
| 2005/0029449 A1 | 2/2005 | Miller | |
| 2005/0040330 A1 | 2/2005 | Kaufman et al. | |
| 2005/0178964 A1* | 8/2005 | Guevremont | G01N 27/624 |
| | | | 250/294 |
| 2005/0194532 A1* | 9/2005 | Guevremont | H01J 49/067 |
| | | | 250/294 |
| 2006/0124846 A1 | 6/2006 | Covey | |
| 2008/0073502 A1 | 3/2008 | Schneider | |
| 2009/0152458 A1 | 6/2009 | Vilkov et al. | |
| 2009/0294648 A1 | 12/2009 | Schneider | |
| 2009/0294650 A1 | 12/2009 | Schneider | |
| 2010/0237233 A1 | 9/2010 | Covey | |
| 2010/0282966 A1 | 11/2010 | Schneider et al. | |
| 2011/0183431 A1 | 7/2011 | Covey | |
| 2014/0339416 A1 | 11/2014 | Vidal-De-Miguel et al. | |
| 2016/0118234 A1 | 4/2016 | Covey | |
| 2016/0187296 A1 | 6/2016 | Blagojevic | |
| 2017/0053789 A1* | 2/2017 | Allsworth | H01J 49/168 |
| 2018/0269048 A1 | 9/2018 | Jarvis | |
| 2019/0086363 A1 | 3/2019 | Covey | |
| 2019/0157060 A1 | 5/2019 | Datwani | |
| 2021/0005441 A1* | 1/2021 | Booy | H01J 49/044 |
| 2021/0366699 A1 | 11/2021 | Campbell et al. | |
| 2023/0176010 A1 | 6/2023 | Covey | |
| 2023/0288372 A1 | 9/2023 | Leigh | |
| 2024/0175846 A1 | 5/2024 | Covey | |

FOREIGN PATENT DOCUMENTS

| | | |
|---|---|---|
| WO | 2012/167254 | 12/2012 |
| WO | 2013/171571 | 11/2013 |
| WO | 2015/022573 | 2/2015 |
| WO | 2016/108126 | 7/2016 |
| WO | 2017/093898 | 6/2017 |
| WO | 2017/158534 | 9/2017 |
| WO | 2021/156775 | 8/2021 |
| WO | 2022/201038 | 9/2022 |
| WO | 2022/269517 | 12/2022 |
| WO | 2023/119062 | 6/2023 |

OTHER PUBLICATIONS

Cumeras, R. et al., "Review on Ion Mobility Spectrometry. Part 1: Current Instrumentation", Analyst, vol. 140, No. 5, Jan. 1, 2015, pp. 1376-1390.

Hager et al., Product ion scanning using a Q-q-Q linear ion trap (Q TRAP) mass spectrometer, Rapid Communications in Mass Spectrometry (2003; 17: 1056-1064).

Ieritano, Christina et al., "Determining Collision Cross Sections from Differential ion Mobility Spectrometry", Analytical Chemistry, vol. 93, No. 25, Jun. 29, 2021, pp. 8937-8944.

Krylov et al., "Temperature effects in differential mobility spectrometry", International Journal of Mass Spectrometry, Elsevier, vol. 279, No. 2-3, Jan. 15, 2009, pp. 119-125.

PCT International Preliminary Report on Patentability Application PCT/IB2022/051606, mailed Sep. 7, 2023, 12 pgs.

PCT International Search Report and Written Opinion in Application PCT/IB2022/051606, mailed Jul. 25, 2022, 20 pgs.

Porta et al., "Gas-phase separation of Drugs and Metabolites using Modifier-Assisted Differentail Ion Mobiliity Spectrometry Hyphenated to Liquid Extraction Surface Analysis and Mass Spectrometry", Anal. Chem., 2013, 85, 24, 11771-11779.

Rajapaske et al., "Automated chemical identification and library building using dispersion plots for differentail mobility spectrometry", Analytical Methods, vol. 10, No. 35, Jan. 1, 2018, pp. 4339-4349.

Schnedier et al., "DMS-MS Separations with Different Transport Gas Modifiers", Int. J. Ion Mobile. Spec (2013) 16: 207-2016.

Schneider et al., "Chemical Effects in the Separation Process of a DMS/MS System", Anal. Chem. 2010, 82, 1867-1880.

Schneider et al., "Differential Mobility Spectrometry/Mass Spectrometry History, Theory, Design Optimization, Simulations, and Applications", Mass Spectrom Rev, 2016, 35(6): 687-737.

Wei et al., "Effects of Solvent Vapor Modifiers for the Separation of Opiod Isomers in Micromachined FAIMS-MS", J. Am. Soc. Mass Spectrom. (2019) 30: 731-742.

* cited by examiner

DYNAMIC HEATING OF A DIFFERENTIAL MOBILITY SPECTROMETER CELL

CROSS-REFERENCE TO RELATED APPLICATION

This application is a National Stage Application of PCT/IB2022/051606, filed on Feb. 23, 2022, which claims the benefit of U.S. Provisional Application No. 63/152,918, filed on Feb. 24, 2021, the entire disclosures of which are incorporated herein by reference in their entireties. To the extent appropriate, a claim of priority is made to each of the above disclosed applications.

BACKGROUND

Mass spectrometry (MS) based methods can achieve label-free, universal mass detection of a wide range of analytes with exceptional sensitivity, selectivity, and specificity. As a result, there is significant interest in improving the throughput of MS-based analysis for many applications. In particular, a number of sample introduction systems for MS-based analysis have been improved to provide higher throughput. Acoustic droplet ejection (ADE) has been combined with an open port interface (OPI) to provide a sample introduction system for high-throughput mass spectrometry. The sample is ejected from electrospray ionization (ESI) source and analyzed by a differential mobility spectrometer (DMS). Thermal equilibration of the DMS cell is required before successful, stable DMS operation (and recording of stable compensation voltage values) can be assured.

SUMMARY

In one aspect, the technology related to a method of operating a differential mobility spectrometer (DMS), the method including: providing a heater disposed proximate a ceramic body of a DMS cell; applying a first control voltage to the heater; detecting a first threshold with a first sensor disposed within a curtain plate, wherein the curtain plate substantially surrounds the DMS cell; applying a second control voltage to the heater based at least in part on the detected first threshold; during application of the second control voltage, performing a mass spectrometry analysis of a gas within the DMS cell. In an example, the sensor includes a temperature sensor, and wherein the first threshold is a temperature. In another example, the temperature sensor is disposed remote from the heater. In yet another example, the temperature sensor is disposed on the ceramic body. In still another example, the temperature sensor is disposed proximate an inlet to a vacuum chamber adjacent the ceramic body.

In another example of the above aspect, the sensor includes a pressure sensor, and the first threshold is a pressure. In an example, the pressure sensor is disposed in an orifice plate adjacent a vacuum chamber coupled to the DMS cell. In another example, the first control voltage is a constant voltage. In yet another example, the second control voltage is less than the first control voltage.

In another aspect, the technology relates to a method of operating a differential mobility spectrometer (DMS), the method including: applying a first control voltage to a heater proximate a ceramic body of a DMS cell, wherein applying the first control voltage heats the heater toward a first temperature; while applying the first control voltage to the heater, performing a mass spectrometry analysis of a first transport gas; detecting a compensation voltage shift of a calibrant ion detected in the first transport gas; applying a second control voltage to the heater when the compensation voltage shift reaches a threshold, wherein applying the second control voltage heats the heater to a second temperature less than the first temperature; and subsequent to applying the second control voltage, performing a mass spectrometry analysis of a second gas when the heater is at the second temperature. In an example, the method further includes displaying a plot based at least in part on the mass spectrometry analysis of the first transport gas. In another example, the method further includes receiving a voltage delivery signal prior to delivering the first control voltage. In yet another example, the method further includes emitting a calibration signal prior to performing the mass spectrometry of the second gas. In still another example, the second gas is different than the first transport gas.

In another aspect, the technology relates to a method of operating a differential mobility spectrometer (DMS), the method including: activating a heater disposed proximate a ceramic body of a DMS cell; detecting a first condition with a first sensor disposed proximate the heater; detecting a second condition with a second sensor disposed remote from the heater; emitting one of: (a) a notification signal when the detected second condition reaches an operational second condition prior to the detected first signal reaching a threshold first condition; and (b) an alarm signal when the detected first condition reaches the threshold first condition prior to the detected second signal reaching the operational second condition. In an example, the operational second condition corresponds to an operational temperature for the DMS cell. In another example, the threshold first condition corresponds to a limit temperature of at least a portion of the DMS. In yet another example, the method further includes terminating activation of the heater when emitting the alarm signal. In still another example, at least one of the notification signal and the alarm signal includes at least one of an audible signal and visual signal.

DETAILED DESCRIPTION

Figure 1:
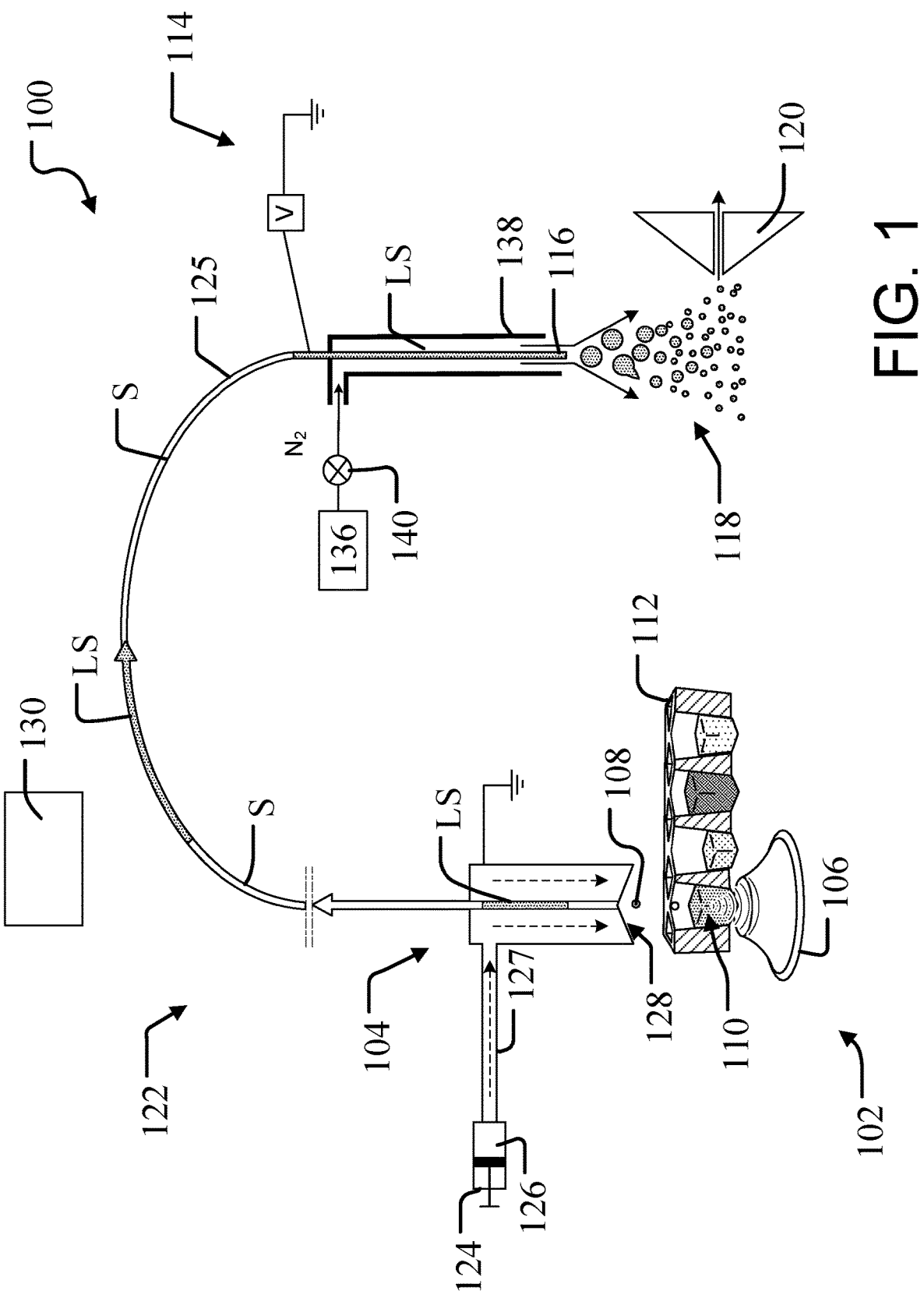
FIG. 1 is a schematic view of an example system combining acoustic droplet ejection (ADE) with an open port interface (OPI) sampling interface and electrospray ionization (ESI) source.

FIG. 1 is a schematic view of an example system 100 combining an ADE 102 with an OPI sampling interface 104 and ESI source 114. The system 100 may be a mass analysis instrument such as a mass spectrometry device that is for ionizing and mass analyzing analytes received within an open end of a sampling OPI. Such a system 100 is described, for example, in U.S. Pat. No. 10,770,277, the disclosure of which is incorporated by reference herein in its entirety. The ADE 102 includes an acoustic ejector 106 that is configured to eject a droplet 108 from a reservoir 112 into the open end of sampling OPI 104. As shown in FIG. 1, the example system 100 generally includes the sampling OPI 104 in liquid communication with the ESI source 114 for discharging a liquid containing one or more sample analytes (e.g., via electrospray electrode 116) into an ionization chamber 118, and a mass analyzer detector (depicted generally at 120) in communication with the ionization chamber 118 for downstream processing and/or detection of ions generated by the ESI source 114. Due to the configuration of the nebulizer probe 138 and electrospray electrode 116 of the ESI source 114, samples ejected therefrom are transformed into the gas phase. A liquid handling system 122 (e.g., including one or more pumps 124 and one or more conduits 125) provides for the flow of liquid from a solvent reservoir 126 to the sampling OPI 104 and from the sampling OPI 104 to the ESI source 114. The solvent reservoir 126 (e.g., containing a liquid, desorption solvent) can be liquidly coupled to the sampling OPI 104 via a supply conduit 127 through which the liquid can be delivered at a selected volumetric rate by the pump 124 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, the flow of liquid into and out of the sampling OPI 104 occurs within a sample space accessible at the open end such that one or more droplets 108 can be introduced into the liquid boundary 128 at the sample tip and subsequently delivered to the ESI source 114.

The system 100 includes an ADE 102 that is configured to generate acoustic energy that is applied to a liquid contained within a reservoir 110 that causes one or more droplets 108 to be ejected from the reservoir 110 into the open end of the sampling OPI 104. A controller 130 can be operatively coupled to and can be configured to operate any aspect of the system 100. Controller 130 can be, but is not limited to, a microcontroller, a computer, a microprocessor, or any device capable of sending and receiving control signals and data. Wired or wireless connections between the controller 130 and the remaining elements of the system 100 are not depicted but would be apparent to a person of skill in the art.

As shown in FIG. 1, the ESI source 114 can include a source 136 of pressurized gas (e.g. nitrogen, air, or a noble gas) that supplies a high velocity nebulizing gas flow to the nebulizer probe 138 that surrounds the outlet end of the electrospray electrode 116. As depicted, the electrospray electrode 116 protrudes from a distal end of the nebulizer probe 138. The nebulizing gas flow interacts with the liquid discharged from the electrospray electrode 116 to enhance the formation of the sample plume and the ion release within the plume for sampling by mass analyzer detector 120, e.g., via the interaction of the high speed nebulizing flow and jet of liquid sample (e.g., analyte-solvent dilution). The liquid discharged may include discrete volumes of liquid samples LS received from each reservoir 110 of the well plate 112. The discrete volumes of liquid samples LS are typically separated from each other by volumes of the solvent S (hence, as flow of the solvent moves the liquid samples LS from the OPI 104 to the ESI source 114, the solvent may also be referred to herein as a transport liquid). The nebulizer gas can be supplied at a variety of flow rates, for example, in a range from about 0.1 L/min to about 20 L/min, which can also be controlled under the influence of controller 130 (e.g., via opening and/or closing valve 140).

It will be appreciated that the flow rate of the nebulizer gas can be adjusted (e.g., under the influence of controller 130) such that the flow rate of liquid within the sampling OPI 104 can be adjusted based, for example, on suction/aspiration force generated by the interaction of the nebulizer gas and the analyte-solvent dilution as it is being discharged from the electrospray electrode 116 (e.g., due to the Venturi effect). The ionization chamber 118 can be maintained at atmospheric pressure, though in some examples, the ionization chamber 118 can be evacuated to a pressure lower than atmospheric pressure.

It will also be appreciated by a person skilled in the art and in light of the teachings herein that the mass analyzer detector 120 can have a variety of configurations. Generally, the mass analyzer detector 120 is configured to process (e.g., filter, sort, dissociate, detect, etc.) sample ions generated by the ESI source 114. By way of non-limiting example, the mass analyzer detector 120 can be a triple quadrupole mass spectrometer, or any other mass analyzer known in the art and modified in accordance with the teachings herein. Other non-limiting, exemplary mass spectrometer systems that can be modified in accordance with various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17: 1056-1064); and U.S. Pat. No. 7,923,681, entitled "Collision Cell for Mass Spectrometer," the disclosures of which are hereby incorporated by reference herein in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 100 including, for example, an ion mobility spectrometer (e.g., a differential mobility spectrometer (DMS)) that is disposed between the ionization chamber 118 and the mass analyzer detector 120 and is configured to separate ions based on their mobility difference between high-field and low-field conditions). Such a DMS is depicted in more detail below in FIG. 2. Additionally, it will be appreciated that the mass analyzer detector 120 can comprise a detector that can detect the ions that pass through the analyzer detector 120 and can, for example, supply a signal indicative of the number of ions per second that are detected.

Figure 2:
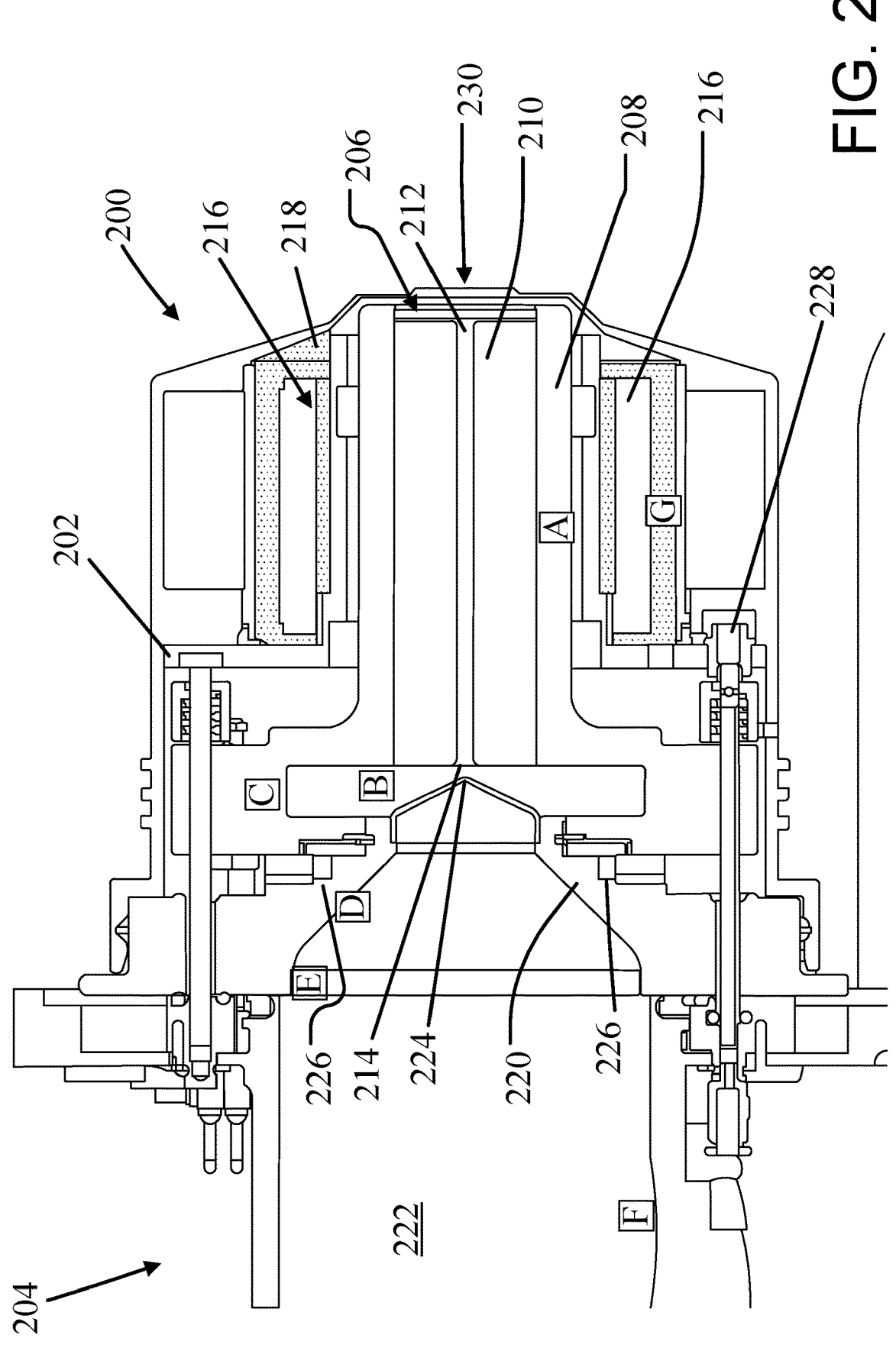
FIG. 2 depicts a partial section view of an example differential mobility spectrometer.

FIG. 2 depicts a partial section view of an example differential mobility spectrometer 200. The components of the differential mobility spectrometer 200 are disposed in a curtain plate 202 that is coupled and sealed to a mass spectrometer 204. The curtain plate 202 closes off the curtain chamber 206 and contains a DMS cell 208, which is typically made of a ceramic material. A plurality of DMS electrodes 210 are disposed within the cell 208 and form an inlet 212 at a first end thereof, and an outlet 214 at a second end thereof. One or more heaters 216 are disposed proximate the cell 208, or in some configurations substantially surround the cell 208. The heater(s) 216 may be surrounded by a volume of ceramic beads 218 to more evenly distribute heat emitted therefrom. An orifice plate 220 is disposed proximate the outlet 214 and within the boundaries of the curtain plate 202. The orifice plate 220 acts as an inlet to the vacuum chamber 222 of the mass spectrometer 204, via a vacuum chamber inlet or orifice aperture 224. A orifice heater 226 is disposed proximate or around the orifice plate 220. A curtain gas inlet 228 allows for introduction of a curtain gas into the curtain plate 202.

In operation, a curtain gas is delivered via the inlet 228 and flows through the ceramic beads 218 towards the inlet 212 of the DMS cell 208. During this gas flow, the heater 216 is activated by delivering a voltage thereto. As the heater temperature increases, so too does the temperature of the ceramic beads 218 surrounding it, the DMS cell 208, and the curtain gas flowing therethrough. After exiting the ceramic beads 218, the curtain gas enters the curtain chamber 206. There, a portion of the gas flows into the inlet 212 and through the DMS cell 208 as a transport gas. An excess volume of the curtain gas above the volumetric flow rate sampled into the orifice plate aperture 224 flows outward through a curtain plate aperture 230. Sensors, depicted as A-G, are depicted in various locations and are described in further detail below, as associated with the methods described herein.

The heater(s) 216, by delivery of the voltage thereto, heat to a stable temperature the transport gas traveling through the DMS cell 208. Stable, well-controlled thermal control of the DMS cell is one of several parameters needed to provide stable and precise compensation voltages (CoVs) for the analytical methods practiced by a mass spectrometer. Once a DMS cell 208 is mounted on the mass spectrometer 204, the time for the cell 208 to reach thermal equilibration may be considerable. Thermal equilibration is required before successful, stable DMS operation (and recording of stable CoV values) can be assured. In some examples, equilibration time may be up to or greater than 30 minutes. This problem may be exacerbated for more advanced and physically larger DMS cells (due to, e.g., larger thermal mass to heat). For such larger systems, even longer thermal equilibration times (some in excess of 2 hours) are potentially possible, and undesirable. The detriments of such long equilibration times may include lack of market acceptance or may cause the acquisition of CoV values during a period of thermal instability, which would result in imprecise CoV value recording. Some existing systems monitor temperatures of the heater 216, which often comes up to temperature in a matter of seconds. However, the thermal equilibration process for the ceramic DMS cell 208 requires additional time to achieve a temperature appropriate for operation and analysis.

As such, the technologies described herein make a direct appraisal of DMS cell thermal equilibration, by utilizing accelerated heating measures to bring the DMS cell up to the desired temperature using, e.g., a non-linear heating profile. A number of examples of such technologies are described herein.

In an example, by using a more direct measure of thermal equilibration, a more aggressive heating schedule could be taken to setting a DMS cell temperature. For example, the heater 216 may be set to an elevated temperature (e.g., as compared to an operational temperature required for mass analysis). To do so, a higher amount of power may be applied to the heater as required to bring the DMS cell 208 more quickly to its operational temperature. In another example, the thermal equilibration of the DMS cell 208 may be monitored by the regular monitoring of CoV shifts of calibrant ions present in the transport gas. Such a method presents advantages over simply measuring the temperature of the heater 216 and waiting for a period of time with the expectation that the DMS cell 208 will eventually reach the required or desired operational temperature. These two methods may also be performed in combination thus mitigating potential overshooting of the desired DMS cell temperature by monitoring the CoV shifts of one or more calibrant ions for a more timely, precise measure of DMS cell thermal equilibration. Further, temperatures at the heater 216 and within the DMS cell 208 may be compared and corrective action taken to prevent overheating or thermal damage to the DMS cell 208 or other system components, that may occur with inadequately monitored heating. In examples, a cooling-off period for the DMS cell 208 may be subsequently required.

Figure 3:
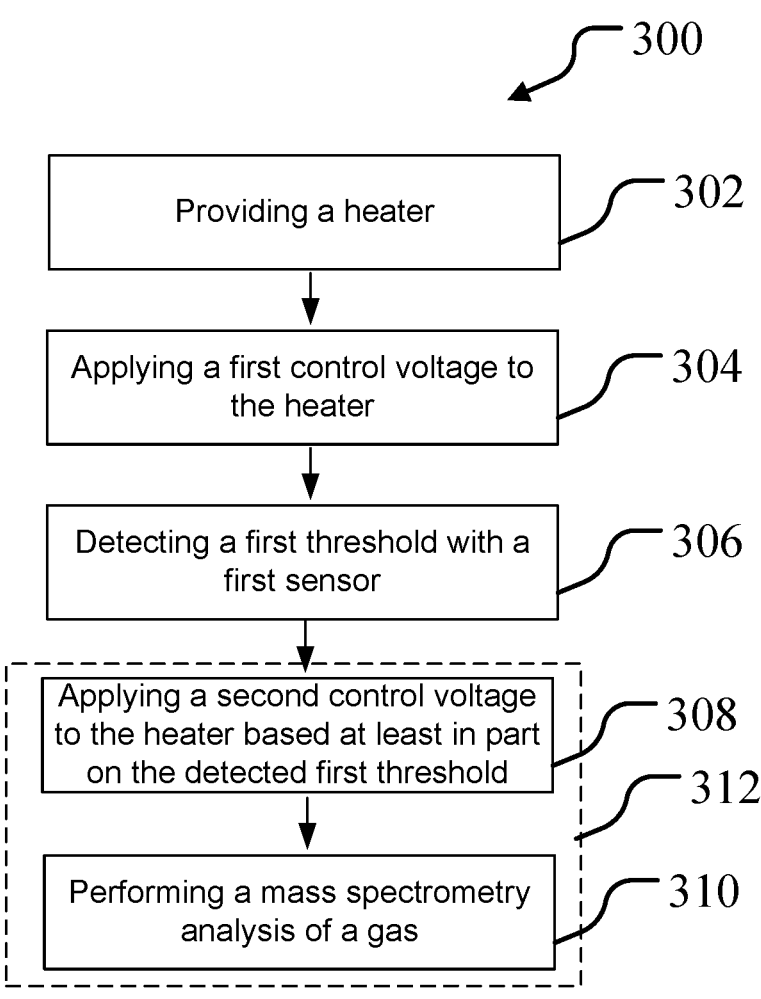
FIG. 3 depicts a method of operating a differential mobility spectrometer.

In furtherance to the first method described generally above, FIG. 3 depicts a method 300 of operating a differential mobility spectrometer (DMS). The DMS may be configured as depicted for example in FIG. 2, and includes a curtain plate connected to a vacuum chamber of a mass spectrometry device. A number of components are disposed within the curtain plate, e.g., a DMS cell having a ceramic body, one or more heaters, one or more sensors, and so on, consistent with the disclosures herein. The method 300 begins with providing a heater disposed proximate a ceramic body of a DMS cell, operation 302. In examples, this may be heater 216 depicted in FIG. 2, although the orifice heater 226 may also be activated alternatively or additionally to apply additional thermal energy to the ceramic body. Flow continues to operation 304, applying a first control voltage to the heater. This application of control voltage may be constant over a period of time, or may increase over a period of time to help reduce the potential of thermal shock to components of the system. Regardless, application of voltage increases the temperature of the heater, the ceramic beads surrounding the heater, and over time, the ceramic body of the DMS cell. In operation 306, a first threshold is detected with a first sensor disposed within the curtain plate. This first threshold may correspond to an operating temperature of the DMS cell, and is lower than the temperature of the heater.

In examples, the sensor may be a temperature sensor to detect temperature thresholds within the ceramic body. For example, sensors A, B, or C may be appropriate as temperature sensors (and locations thereof). Temperature sensors may be disposed remote from the heater (e.g., sensor B or C), or may be embedded in the ceramic body (e.g., sensor A or C). In other examples, the temperature sensor may be disposed proximate the vacuum chamber inlet and on the ceramic body (e.g., sensor B). Other acceptable sensor locations would be apparent to a person of skill in the art upon reading this disclosure, to ensure an accurate temperature measurement of the DMS cell. In other examples, the sensor may be a pressure sensor to detect pressure thresholds within the vacuum chamber. For example, sensors D, E, or F may be appropriate as pressure sensors (and locations thereof). The pressure sensors may be embedded in components proximate the vacuum chamber (e.g., sensor E), or may be installed on the surface thereof (e.g., sensor D). In other examples, the pressure sensor may be disposed within the vacuum chamber itself (e.g., sensor F). Other acceptable sensor locations would be apparent to a person of skill in the art upon reading this disclosure, to ensure an accurate condition measurement of the DMS cell. Pressure detected by the pressure sensor may be used to calculate a corresponding temperature of the DMS cell, or a list of detected pressures and corresponding temperatures may be accessed via a look-up table. In other examples, temperature sensors B or C may be located within the orifice plate 220. In such examples, the orifice heater 226 need not be utilized and/or activated, such that the temperature readings at locations B and C accurately reflect thermal transfer from the heater 216 to the orifice plate 220.

Returning to FIG. 3, flow continues with operation 308, applying a second control voltage to the heater based at least in part on the detected first threshold. This second control voltage is lower than the first control voltage and results in reduced thermal output from the heater. Since the thermal output from the heater reduces at a rate faster than it increases, application of this second, lower voltage is generally sufficient to reduce the thermal output of the heater so as to maintain a temperature of the transport gas more appropriate for an analysis operation. In certain examples, the second control voltage may be zero, to enable an accelerated reduction in thermal output of the heater, e.g., to prevent overheating. Flow continues to operation 310, performing a mass spectrometry analysis of a gas within the DMS cell. Dashed line 312 indicates that operation 312 is performed during operation 310, where the second, lower control voltage enables the heater to maintain a temperature within the DMS cell appropriate for analysis operations. The gas may be one introduced via the ESI source of FIG. 1.

Figure 4:
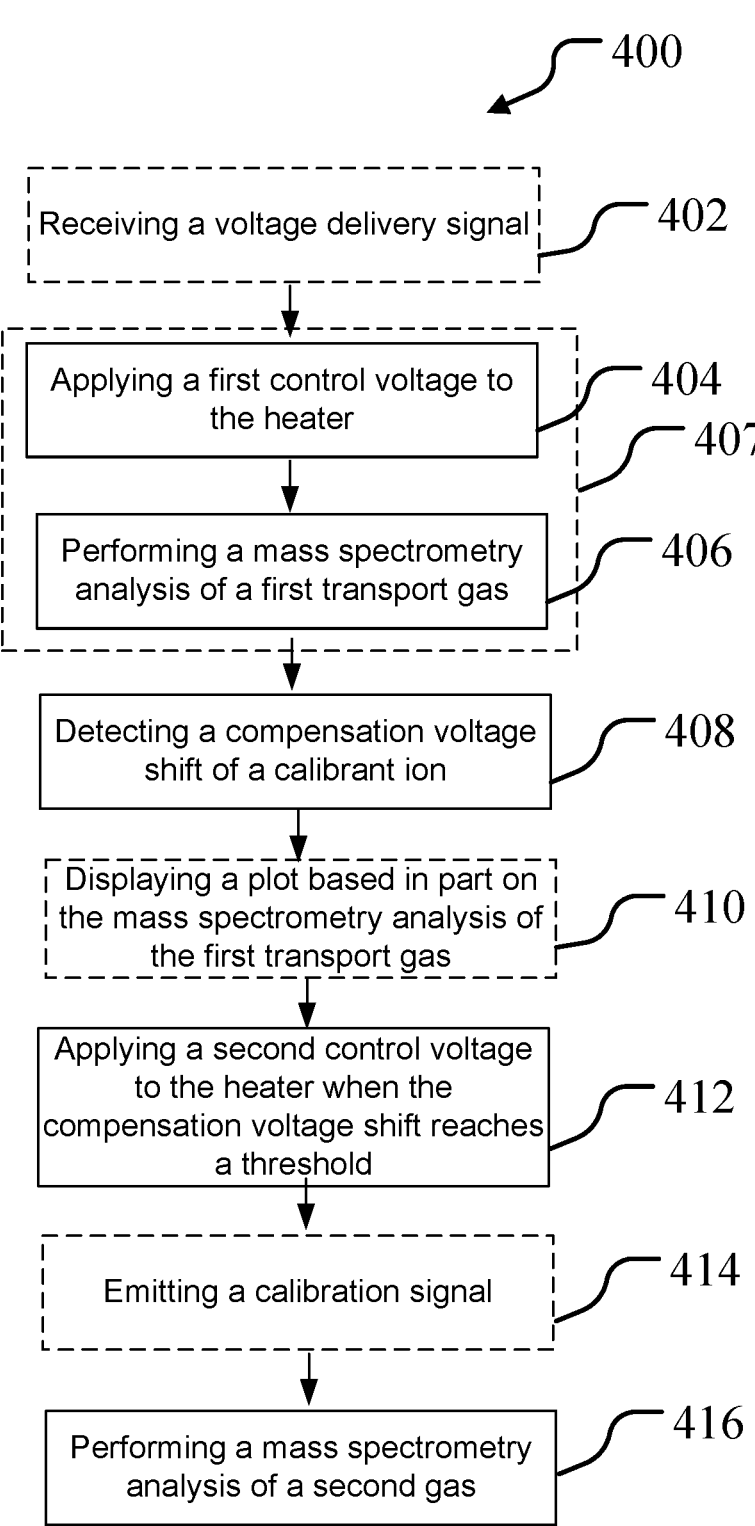
FIG. 4 depicts another method of operating a differential mobility spectrometer.

In furtherance to the second method described generally above, FIG. 4 depicts another method 400 of operating a DMS. As noted elsewhere herein, the DMS may be configured as depicted for example in FIG. 2, and includes a curtain plate connected to a vacuum chamber of a mass spectrometry device. A number of components are disposed within the curtain plate, e.g., a DMS cell having a ceramic body, one or more heaters, one or more sensors, and so on, consistent with the disclosures herein. The method may begin with optional operation 402, receiving a voltage delivery signal. This voltage delivery signal may be entered by a user or a technician performing set up, calibration, repairs, or analysis on the DMS. The voltage delivery signal may correspond to a desired thermal output by the heater, an estimated or calculated control voltage to be delivered to the heater, an activation signal that automatically begins the method 400, or some other signal. Operation 404 includes applying a first control voltage to the heater proximate the ceramic body of a DMS cell. This application of the first control voltage heats the heater toward a first temperature, which is typically higher than a required or desired operational temperature of the DMS. The first temperature may not be reached during the method 400 and instead represents a temperature elevated relative to that of a normal operational temperature at which the heater may operate. The method 400 continues with operation 406, performing a mass spectrometry analysis of a first transport gas, and dashed line 407 indicates that operations 404 and 406 are performed simultaneously. The mass spectrometry analysis performed in operation 406 may detect a calibrant ion present in the first transport gas. Operation 408, detecting a CoV shift of the calibrant ion detected in the first transport gas, is then performed. In certain examples, a plot based at least in part on the mass spectrometry analysis of the first transport gas (e.g., depicting the CoV shift), may be displayed as operation 410.

Figure 5:
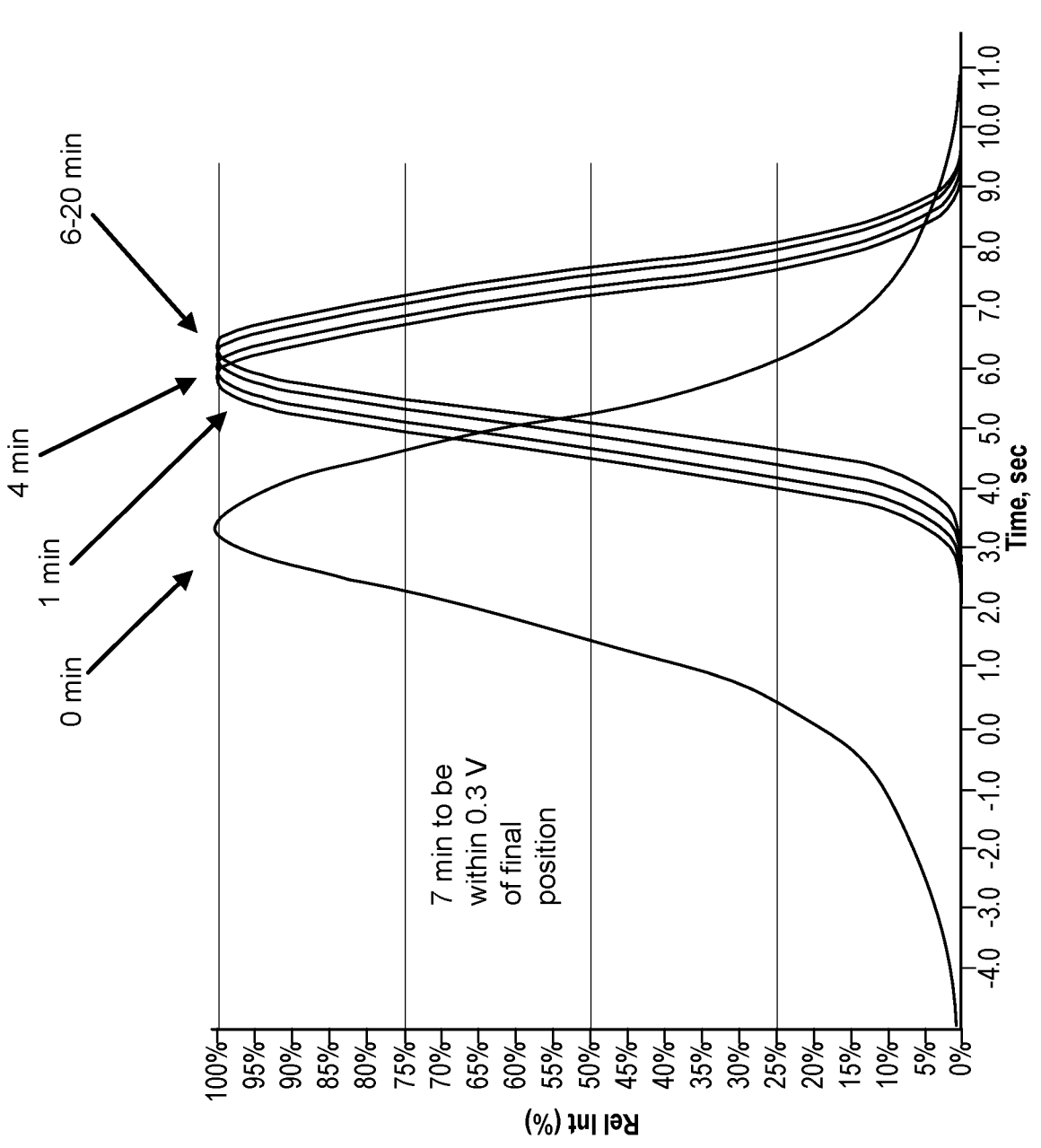
FIG. 5 depicts an example plot of compensation voltage shifts of a calibrant ion, as provided by the method of FIG. 4.

FIG. 5 depicts such a plot of CoV shifts of a calibrant ion, as provided by the method of FIG. 4. The plot includes four peaks that represent the CoV shift of the calibrant ions in the first transport gas. In the depicted plot, a higher constant voltage first delivered to the heater results in a heater temperature of about 422° C., which is well in excess of an operational set point temperature for the ceramic body of about 361° C. The four peaks represent the compensation voltage shift at 0 minutes (when the first control voltage is initially delivered to the heater), at 4 minutes from initial delivery, at 5 minutes from initial delivery, and at 6-20 minutes from initial delivery. As can be seen, the CoV shift is reduced with increased time. From this plot, it can be determined that the CoV shift is within an acceptable target voltage for DMS operation at about 7 minutes from initial delivery. This corresponds to a threshold of about 0.3V from the final position.

Returning to FIG. 4, detection of the threshold being reached causes a second control voltage to be applied to the heater, operation 412. As with the method 300 above, application of this lower second control voltage heats the heater to a second temperature that is less than the first temperature. At this time, a calibration signal may be emitted (e.g., visibly or audibly), operation 414, indicating to a user or technician that the device is now calibrated and ready to perform analysis procedures. At this point, operation 416, performing a mass spectrometry analysis of a second gas when the heater is at the second temperature, is performed. This second gas is typically different than the first transport gas and may include samples to be tested, in accordance with known mass spectrometry analysis procedures. As discussed above, the method 400 of FIG. 4 may be performed in conjunction with the method of FIG. 3. It will be apparent to those of skill in the art that some of the steps 402-416 may be modified or omitted without deviating from the scope of the present disclosure. In one example, it is possible to eliminate step 414 if the user manually monitors the plot from step 410.

Figure 6:
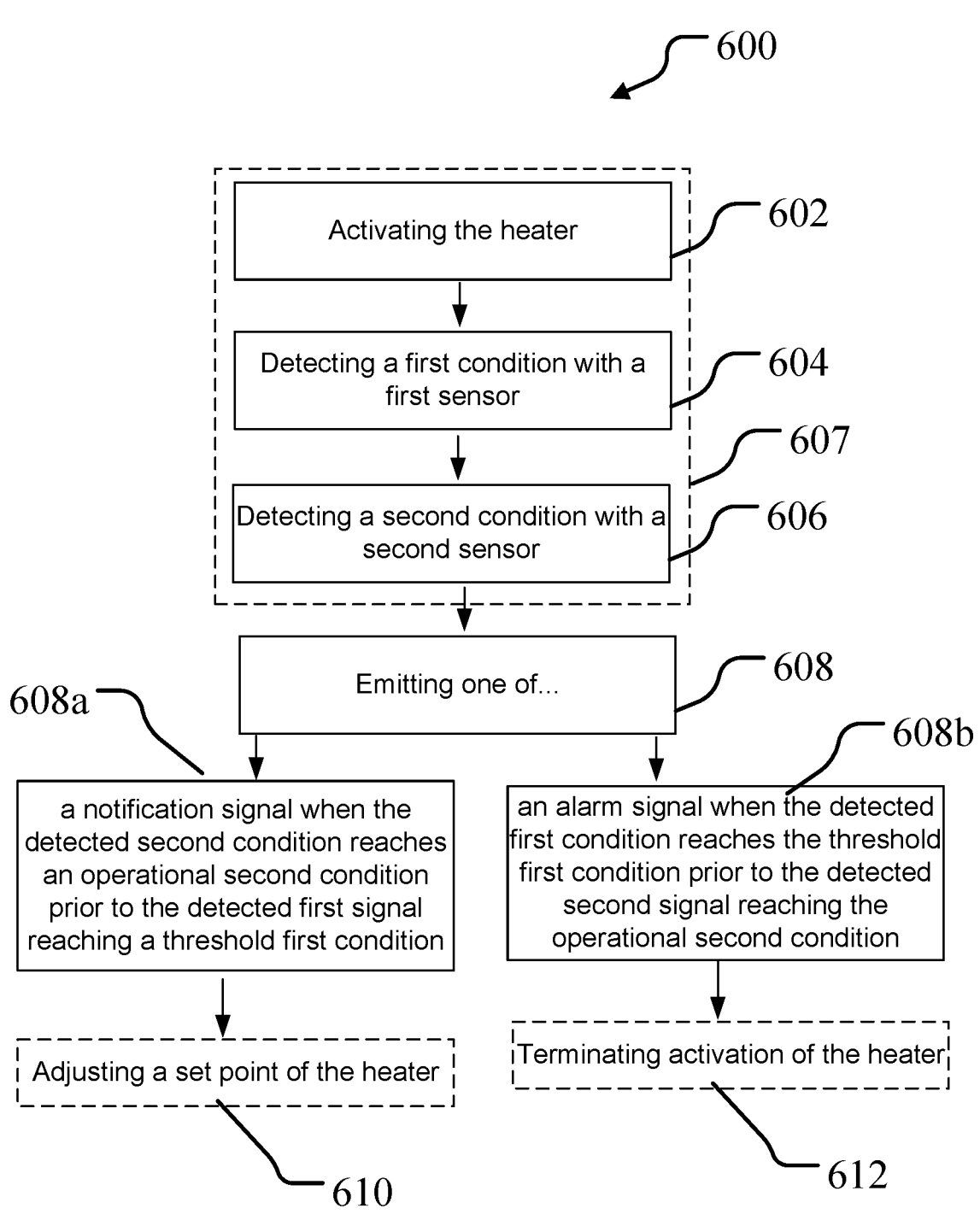
FIG. 6 depicts another method of operating a differential mobility spectrometer.

FIG. 6 depicts another method 600 of operating a differential mobility spectrometer. As noted elsewhere herein, the DMS may be configured as depicted for example in FIG. 2 and includes a curtain plate connected to a vacuum chamber of a mass spectrometry device. A number of components are disposed within the curtain plate, e.g., a DMS cell having a ceramic body, one or more heaters, one or more sensors, and so on, consistent with the disclosures herein. The method 600 begins with operation 602, activating the heater disposed proximate the ceramic body of the DMS cell. As noted above, activation may be in the form of an application of a control voltage to the heater and may be based on a first desired set point of the heater. Flow continues to operation 604, detecting a first condition with a first sensor disposed proximate the heater. Such a sensor may be sensor G, depicted in FIG. 2 as located adjacent the heater, or in other examples such a sensor may be embedded in the heater body itself. In that regard, sensor G may be a temperature sensor and the first condition may be a temperature, e.g., the thermal output of the heater. Operation 606 includes detecting a second condition with a second sensor disposed remote from the heater. As regards to operation 606, the second sensor may be temperature sensors, e.g., sensors A, B, or C in FIG. 2, which may detect temperature conditions. Alternatively, the second sensor may be pressure sensors, e.g., sensors D, E, or F in FIG. 2, which may detect pressure conditions that correspond to temperatures. Dashed box 607 indicates that ongoing detection with the first and second sensors is performed while the heater is activated. Thereafter, a signal, which may be audible and/or visual, is emitted in operation 608.

One such signal may be a notification signal, 608*a*, which is emitted when the detected second condition reaches an operational second condition prior to the detected first signal reaching a threshold first condition. The operational second condition corresponds to an operational temperature for the DMS cell, while the threshold first condition corresponds to a limit temperature of at least a portion of the DMS. In examples, the limit temperature may correspond to an over-heat condition of the heater. In other examples, other conditions detrimental to the operation of the DMS may correspond to the limit temperature. As operation 608a is indicative of the DMS cell reaching an operational temperature, operation 610, adjusting a set point of the heater, may be performed. This may cause a lower control voltage to be delivered to the heater, so as to maintain a required operational temperature, e.g., at a lower set point.

The second such signal may be an alarm signal, 608b, which is emitted when the detected first condition reaches the threshold first condition prior to the detected second signal reaching the operational second condition. As noted above, the operational second condition corresponds to an operational temperature for the DMS cell, while the threshold first condition corresponds to a limit temperature of at least a portion of the DMS (e.g., an overheat condition of the heater or other condition). As operation 608b is indicative of an undesirable condition in the DMS, operation 612, terminating activation of the heater, may be performed. Thus, the method of 600 leverages the placement of the various sensors to enable reduced time for the DMS cell to achieve an operational condition, without compromising the operational integrity of the various components utilized therein.

Figure 7:
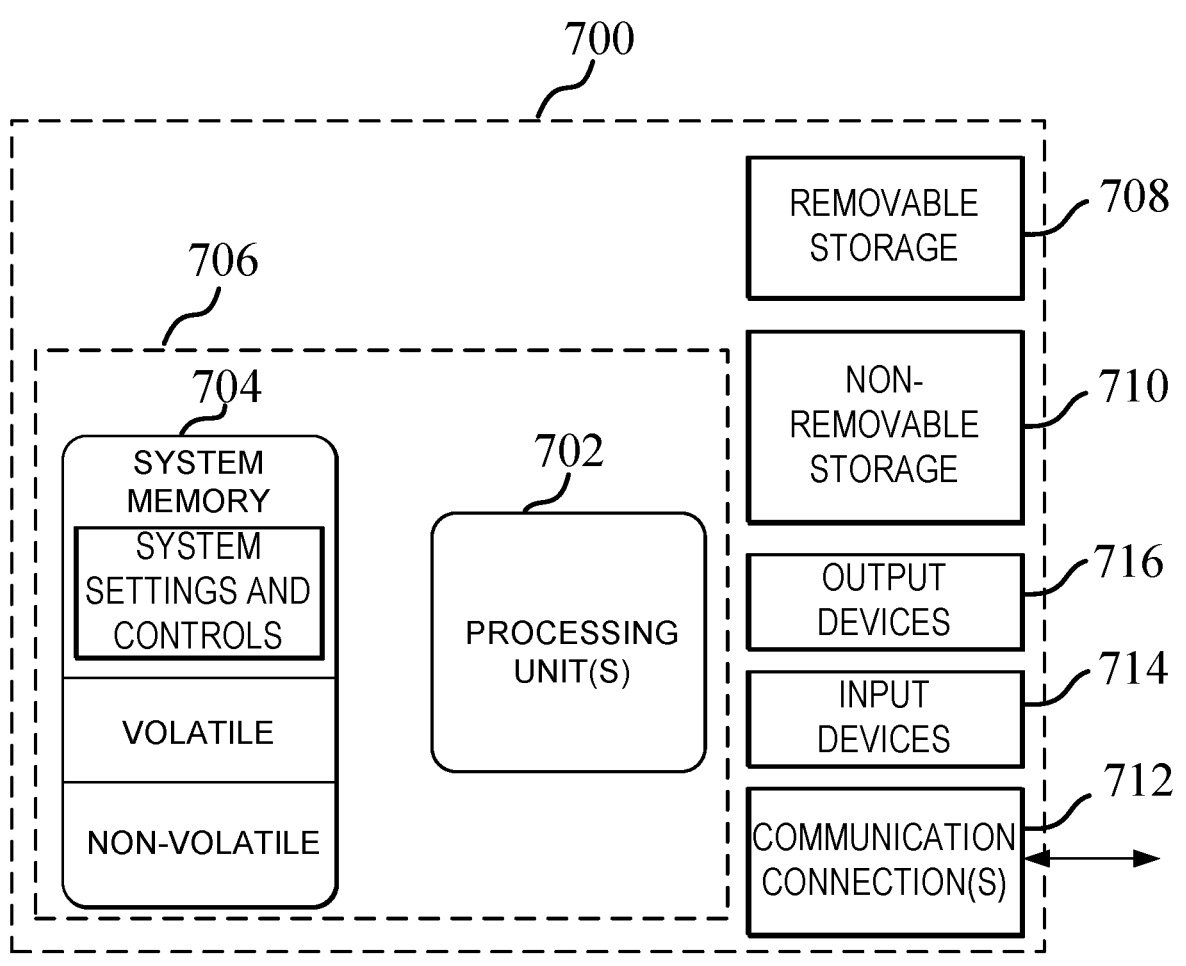
FIG. 7 depicts an example of a suitable operating environment in which one or more of the present examples can be implemented.

FIG. 7 depicts one example of a suitable operating environment 700 in which one or more of the present examples can be implemented. This operating environment may be incorporated directly into the controller for a mass spectrometry system, e.g., such as the controller depicted in FIG. 1. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, instructions to activate the heater(s), perform analysis, etc., or perform other methods disclosed herein) can be volatile (such as RAM), non-volatile (such as ROM, flash memory, etc.), or some combination of the two. This most basic configuration is illustrated in FIG. 7 by dashed line 706. Further, environment 700 can also include storage devices (removable, 708, and/or non-removable, 710) including, but not limited to, magnetic or optical disks or tape. Similarly, environment 700 can also have input device(s) 714 such as touch screens, keyboard, mouse, pen, voice input, etc., and/or output device(s) 716 such as a display, speakers, printer, etc. Also included in the environment can be one or more communication connections 712, such as LAN, WAN, point to point, Bluetooth, RF, etc.

Operating environment 700 typically includes at least some form of computer readable media. Computer readable media can be any available media that can be accessed by processing unit 702 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 700 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 700 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 700 is part of a network that stores data in remote storage media for use by the computer system 700.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of operating a differential mobility spectrometer (DMS), the method comprising:

providing a heater disposed proximate a ceramic body of a DMS cell;

applying a first control voltage to the heater;

detecting a first threshold with a first sensor disposed within a curtain plate, wherein the curtain plate substantially surrounds the DMS cell;

applying a second control voltage to the heater based at least in part on the detected first threshold;

during application of the second control voltage, performing a mass spectrometry analysis of a gas within the DMS cell.

2. The method of claim 1, wherein the sensor comprises a temperature sensor, and wherein the first threshold is a temperature.

3. The method of claim 2, wherein the temperature sensor is disposed remote from the heater.

4. The method of claim 2, wherein the temperature sensor is disposed on the ceramic body.

5. The method of claim 2, wherein the temperature sensor is disposed proximate an inlet to a vacuum chamber adjacent the ceramic body.

6. The method of claim 1, where in the sensor comprises a pressure sensor, and wherein the first threshold is a pressure.

7. The method of claim 6, wherein the pressure sensor is disposed in an orifice plate adjacent a vacuum chamber coupled to the DMS cell.

8. The method of claim 1, wherein the first control voltage is a constant voltage.

9. The method of claim 1, wherein the second control voltage is less than the first control voltage.

* * * * *